United States Patent
Bragin

(10) Patent No.: US 9,767,958 B2
(45) Date of Patent: Sep. 19, 2017

(54) CAPACITOR ASSEMBLY

(71) Applicant: COHERENT LASERSYSTEMS GMBH & CO. KG, Göttingen (DE)

(72) Inventor: Igor Bragin, Göttingen (DE)

(73) Assignee: COHERENT LASERSYSTEMS GMBH & CO., LG, Göttingen (DE)

( * ) Notice: Subject to any disclaimer, the term of this patent is extended or adjusted under 35 U.S.C. 154(b) by 49 days.

(21) Appl. No.: 14/887,783

(22) Filed: Oct. 20, 2015

(65) Prior Publication Data
US 2016/0155568 A1 Jun. 2, 2016

Related U.S. Application Data

(60) Provisional application No. 62/086,144, filed on Dec. 1, 2014.

(51) Int. Cl.
*H01G 4/008* (2006.01)
*H01G 4/12* (2006.01)

(52) U.S. Cl.
CPC ............ *H01G 4/008* (2013.01); *H01G 4/129* (2013.01)

(58) Field of Classification Search
CPC .......... H01G 4/105; H01G 4/129; H01G 4/33; H01G 4/005; H01G 4/008
See application file for complete search history.

(56) References Cited

U.S. PATENT DOCUMENTS

| | | | | |
|---|---|---|---|---|
| 2007/0247784 A1* | 10/2007 | Wang | ................... | H01G 4/005 361/311 |
| 2010/0202099 A1* | 8/2010 | Yeh | .................. | H01G 4/008 361/305 |
| 2010/0214718 A1* | 8/2010 | Yeh | .................. | H01L 28/60 361/305 |
| 2014/0362491 A1* | 12/2014 | Adachi | ................. | H01G 4/105 361/270 |
| 2015/0371777 A1* | 12/2015 | Hsieh | .................. | H01G 4/10 361/305 |

OTHER PUBLICATIONS

"Schott Poweramic™ Glass-Ceramics: A New Class of Dielectrics for High Voltage Capacitors", Schott North America, Inc., May 29, 2014, 2 pages.

* cited by examiner

*Primary Examiner* — Dion R Ferguson
(74) *Attorney, Agent, or Firm* — Morrisson & Foerster LLP

(57) ABSTRACT

An electrical capacitor includes a dielectric spacer. Metal electrodes are held in contact with opposite surfaces of the dielectric spacer by magnetic force.

20 Claims, 2 Drawing Sheets

CAPACITOR ASSEMBLY

PRIORITY

This application claims priority to U.S. Provisional Patent Application Ser. No. 62/086,144, filed Dec. 1, 2014, the entire disclosure of which is incorporated herein by reference.

TECHNICAL FIELD OF THE INVENTION

The present invention relates in general to electrical capacitors. The invention relates in particular to electrical capacitors having high-strength dielectric spacers.

DISCUSSION OF BACKGROUND ART

A new dielectric material based on glass-ceramics for high-voltage (HV) capacitors has recently been developed. This material is sold under a trade name POWERAMIC™, by Schott AG of Mainz, Germany. The material is produced in a process of melting amorphous glass then subjecting the molten glass to a time-temperature profile which causes nano-sized crystal to grow in the glass. As a result, a highly homogenous and pore-free glass-ceramic is obtained.

This glass ceramic offers an extraordinarily high energy storage density and dielectric strength even at high temperatures which allows building very thin HV capacitors. By way of example a standard 2 nanofarad (nF) capacitor using a strontium titanate or barium titanate dielectric spacer, has a spacer-thickness of about 15 mm. Substituting the new glass-ceramic for the spacer would allow the dielectric thickness to be reduced to about 3 mm. Such a thin capacitor would be particularly advantageous in certain applications, for example, in the design of electric pulse generators for creating super-atmospheric discharges in excimer laser tubes.

A standard technique for assembling a two-terminal capacitor is to metallize surfaces of a thick dielectric spacer then solder bond metal electrodes to opposite sides of dielectric spacer. Soldering is not compatible with the above-discussed electric pulse generators. An alternative assembly technique preferably not requiring metallization would be more suitable.

SUMMARY OF THE INVENTION

In one aspect, an electrical capacitor in accordance with the present invention comprises a dielectric spacer having first and second opposite surfaces. First and second metal electrodes are in contact with respectively the first and second surfaces of the dielectric spacer. The metal electrodes are held in contact with the first and second surfaces of the dielectric spacer by magnetic force.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
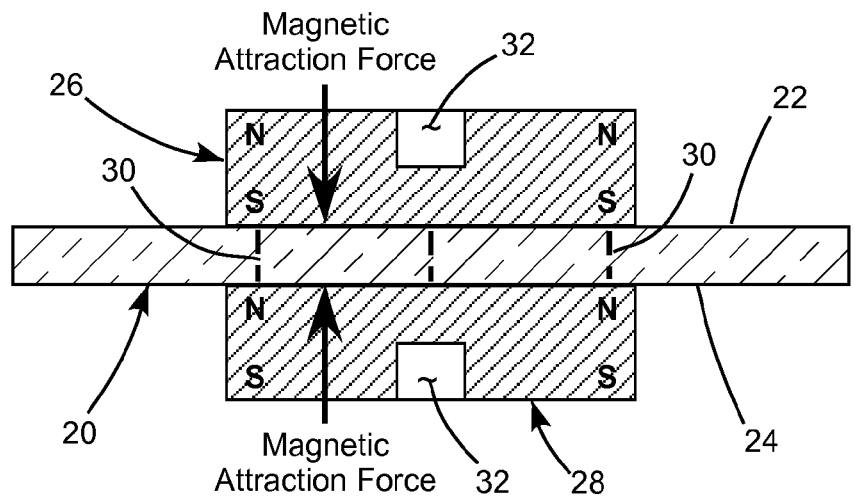
FIG. 1 is a cross-section view schematically illustrating one preferred embodiment of an electrical capacitor in accordance with the present invention, including a dielectric spacer sheet between two magnetized metal electrodes, with the electrodes held in contact with opposite surfaces of the spacer by magnetic attraction force between the magnetic electrodes.

Turning now to the drawings, wherein like features are designated by like reference numerals, FIG. 1 schematically illustrates one preferred embodiment 10 of an electrical capacitor in accordance with the present invention. Capacitor 10 includes a dielectric spacer sheet 20 having opposite surfaces 22 and 24. Spacer sheet 20 is most preferably of a glass-ceramic of the type discussed above, and preferably has a thickness less than 5 mm. Spacer sheet 20 is sandwiched between a permanent magnet 26 and a permanent magnet 28. These magnets function as electrodes of capacitor 10 and can be referred to, accordingly, as magnetized metal electrodes. Each of the magnets includes a socket 32 into which an electrical lead can be inserted. Suitable material for magnets 26 and 28 include but are not limited to neodymium-iron and samarium-cobalt.

Magnets 26 and 28 are polarized with opposite poles thereof (N and S) facing each other such that a magnetic attraction force (schematically indicated) urges the magnets toward holding the magnets in contact with surfaces 22 and 24 of the spacer sheet without mechanical or adhesive assistance. In spacer sheet 20 between magnets 26 and 28, magnetic lines-of-force (designated by bold dashed lines 30) are perpendicular to surfaces 22 and 24 of the spacer sheet. Optionally surfaces 22 and 24 of spacer-sheet 20 can be metallized to improve electrical contact between the spacer sheet and the magnets, but if mating surfaces of the spacer sheet and the magnets are substantially free of defects metallization should not be necessary. Indeed it can be preferable to avoid metallization of the spacer sheet of the present invention, not only to avoid the cost of the two-step (vacuum deposition followed by electroplating) metallization process, but because any stress inequality in the metallized surfaces could distort the spacer sheet to a point where the spacer sheet could not be reliably used in the inventive magnetic assembly.

Figure 2:
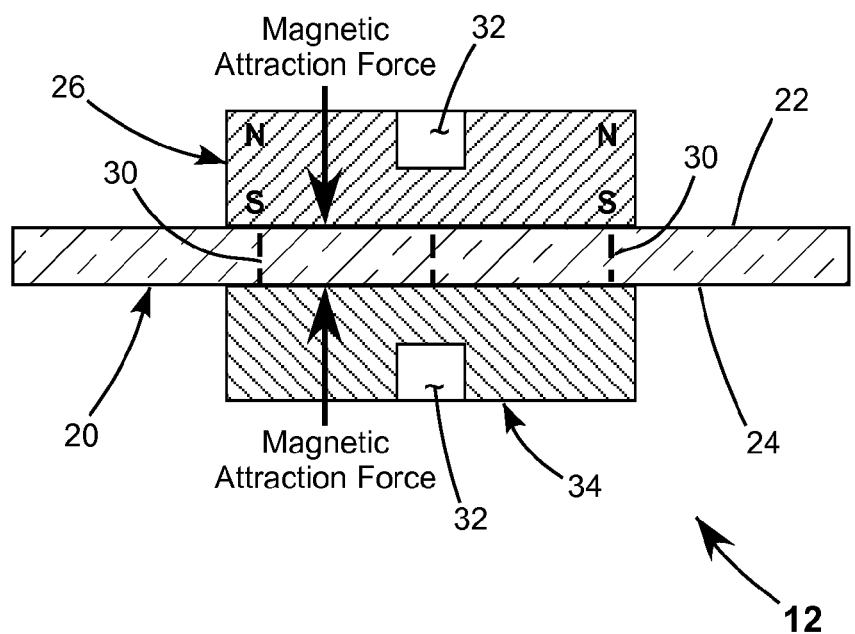
FIG. 2 is a cross-section view schematically illustrating another preferred embodiment of an electrical capacitor in accordance with the present invention, similar to the capacitor of FIG. 1 but wherein one of the magnetized metal electrodes is replaced by an electrode of a magnetically susceptible metal.

FIG. 2 schematically illustrates another preferred embodiment 12 of an electrical capacitor in accordance with the present invention. Capacitor 12 is similar to the capacitor of FIG. 1, but magnet 28 of capacitor 10 is replaced in capacitor 12 with an electrode 34 of a magnetically susceptible metal.

Figure 3:
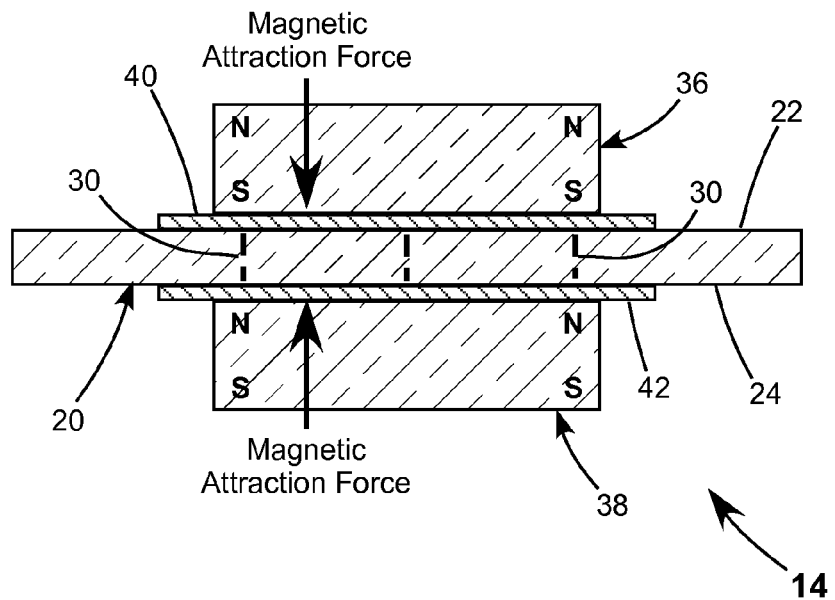
FIG. 3 is a cross-section view schematically illustrating yet another preferred embodiment of an electrical capacitor in accordance with the present invention, similar to the capacitor of FIG. 1 but wherein each of the magnetized metal electrodes is replaced with ceramic magnet, and wherein there are two metal sheet electrodes, one thereof between each of the magnets and the dielectric spacer sheet.

FIG. 3 schematically illustrates another preferred embodiment 14 of an electrical capacitor in accordance with the present invention. Capacitor 14 is similar to the capacitor 10 of FIG. 1 with exceptions as follows. In capacitor 14, metal magnets 26 and 28 of capacitor 10 are replaced by ceramic magnets 36 and 38, respectively. This necessitates providing separate sheet-metal electrodes 40 and 42, which are located between the magnets and the spacer sheet. Electrodes 40 and 42 are held in contact with spacer sheet 20, and the magnets held in contact with the electrodes, by magnetic attraction of the magnets to each other as discussed above. Electrical contact to electrodes 40 and 42 can be made by any standard means. Capacitor 14 may be used, for example, instead of capacitor 10 when corrosion of metal magnets may be of concern. This could justify an additional cost and complexity due to the additional components, and possible extra care in preparation of mating surfaces.

Figure 4:
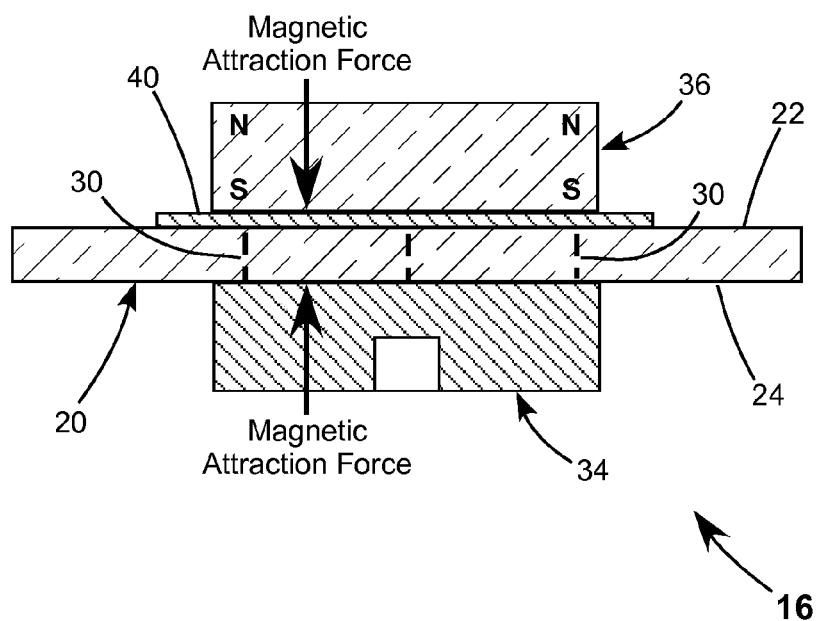
FIG. 4 is a cross-section view schematically illustrating still another preferred embodiment of an electrical capacitor in accordance with the present invention, similar to the capacitor of FIG. 3 but wherein one of the metal sheet electrodes and the corresponding ceramic magnet is replaced by an electrode of a magnetically susceptible metal.

FIG. 4 schematically illustrates still another embodiment 16 of an electrical capacitor in accordance with the present invention. Capacitor 16 is similar to capacitor 14 of FIG. 3 with an exception that ceramic magnet 38 of capacitor 12 is replaced by magnetically susceptible metal electrode 34 of above-discussed capacitor 12 of FIG. 2. This eliminates the need for one sheet electrode. Electrode 34 can be of a relatively corrosion resistant metal such as copper, nickel or aluminum.

In the above described embodiments of the inventive capacitor magnets used to prove magnetic force for holding the capacitors together are permanent magnets. In theory at least, electromagnets could be used to provide such magnetic force. This however is unlikely to be practical or cost effective.

Further any of the embodiments could be enclosed in a ceramic or glass envelope for protecting the capacitor from corrosion, nearby surface arcing, atmospheric ionization, and the like. Such protective envelopes for capacitors are well known in the art, and a description thereof is not necessary for understanding principles of the present invention. Accordingly such a description is not presented herein.

In summary, the present invention is described above in terms of preferred embodiments. The invention is not limited, however, by the embodiments described and depicted herein. Rather, the invention is limited only by the claims appended hereto.

What is claimed is:

1. An electrical capacitor, comprising:
  a dielectric spacer having first and second opposite surfaces;
  first and second metal electrodes in contact with respectively the first and second surfaces of the dielectric spacer; and
  wherein the metal electrodes are held in contact with the first and second surfaces of the dielectric spacer by magnetic force.

2. The capacitor of claim 1, wherein the first and second electrodes are magnets providing the magnetic force.

3. The capacitor of claim 2, wherein the magnetic force is provided by magnetic attraction between the magnets.

4. The capacitor of claim 3, wherein the magnets are polarized such that a magnetic field between the magnets is about perpendicular to the first and second surfaces of the dielectric spacer.

5. The capacitor of claim 2, wherein the metal is selected from the group of metals consisting of neodymium-iron and samarium-cobalt.

6. The capacitor of claim 1, wherein the first and second electrodes are metal sheets and the spacer and electrodes are sandwiched between first and second magnets providing the magnetic force.

7. The capacitor of claim 6, wherein the first and second magnets are ceramic magnets.

8. The capacitor of claim 1, wherein the dielectric spacer is a glass-ceramic spacer.

9. The capacitor of claim 8, wherein the dielectric spacer has a thickness less than about 5 millimeters.

10. The capacitor of claim 9, wherein the dielectric spacer has a thickness of about 3 millimeters.

11. The capacitor of claim 1, wherein the first electrode is a magnetized metal, the second electrode is a magnetically-susceptible metal, and the magnetic force is provided by magnetic attraction between the magnetized-metal electrode and the magnetically-susceptible-metal electrode.

12. The capacitor of claim 11, wherein the magnetically-susceptible metal is corrosion resistant.

13. The capacitor of claim 12, wherein the magnetically-susceptible metal is selected from the group of metals consisting of copper, nickel, and aluminum.

14. The capacitor of claim 1, wherein the first electrode is a metal sheet and the second electrode is a magnetically-susceptible metal electrode, and wherein the metal sheet is sandwiched between a ceramic magnet and the dielectric spacer, and the magnetic force is provided by magnetic attraction between the ceramic magnet and the magnetically-susceptible-metal electrode.

15. The capacitor of claim 14, wherein the magnetically-susceptible metal is corrosion resistant.

16. The capacitor of claim 15, wherein the magnetically-susceptible metal is selected from the group of metals consisting of copper, nickel, and aluminum.

17. An electrical capacitor, comprising:
  a dielectric spacer having first and second opposite surfaces;
  first and second magnetized-metal electrodes in contact with respectively the first and second surfaces of the dielectric spacer;
  wherein the magnetized-metal electrodes are held in contact with the first and second surfaces of the dielectric spacer by magnetic force; and
  wherein the magnetic force is provided by attraction between the magnetized-metal electrodes.

18. The capacitor of claim 17, wherein the metal is selected from the group of metals consisting of neodymium-iron and samarium-cobalt.

19. The capacitor of claim 17, wherein the dielectric spacer is a glass-ceramic spacer.

20. The capacitor of claim 19, wherein the dielectric spacer has a thickness less than about 5 millimeters.

* * * * *